April 21, 1942.　　D. B. DICKERSON　　2,280,644
EMERGENCY FOOT BRAKE LEVER
Filed July 21, 1941　　2 Sheets-Sheet 1
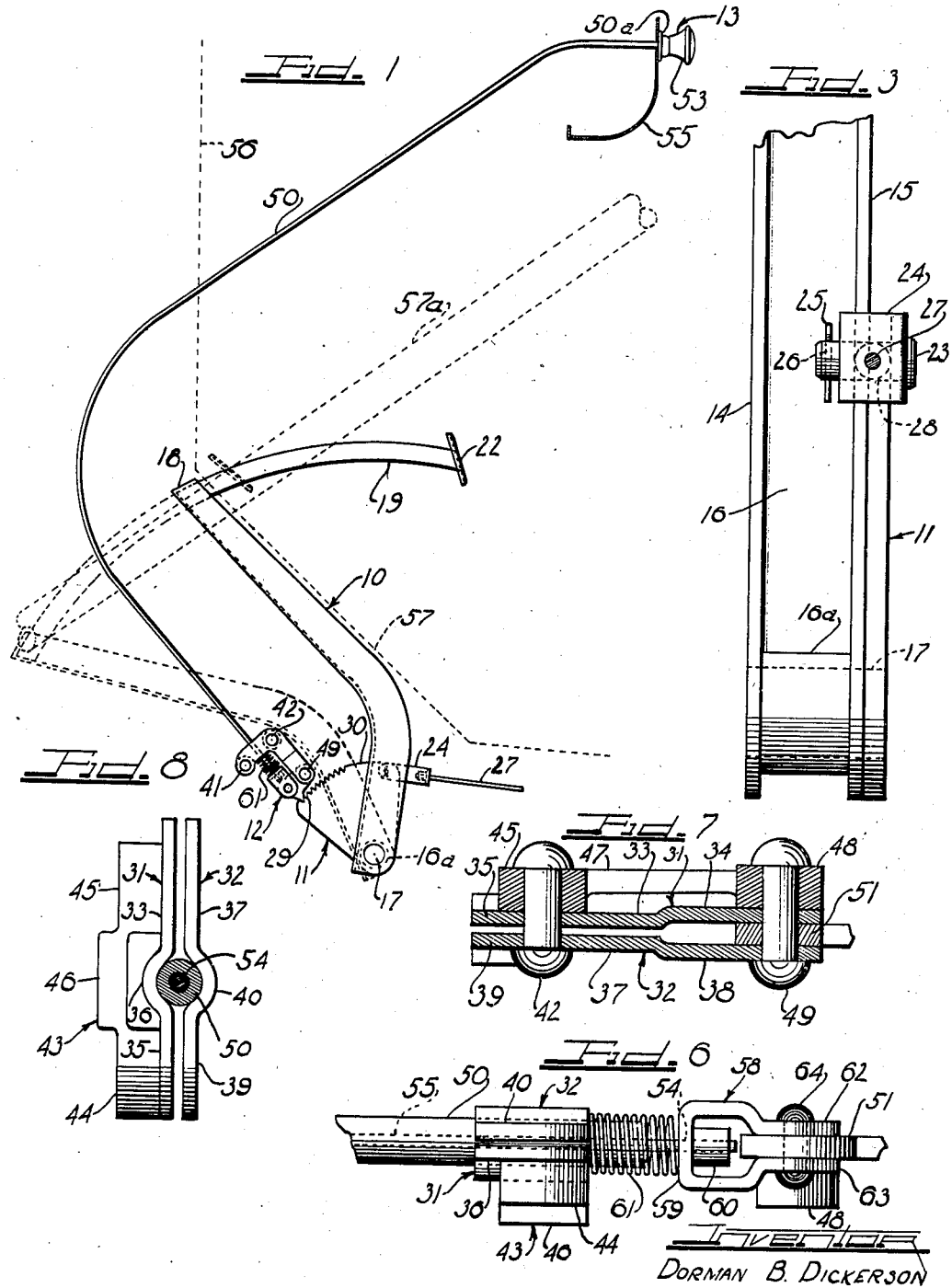
Inventor
DORMAN B. DICKERSON

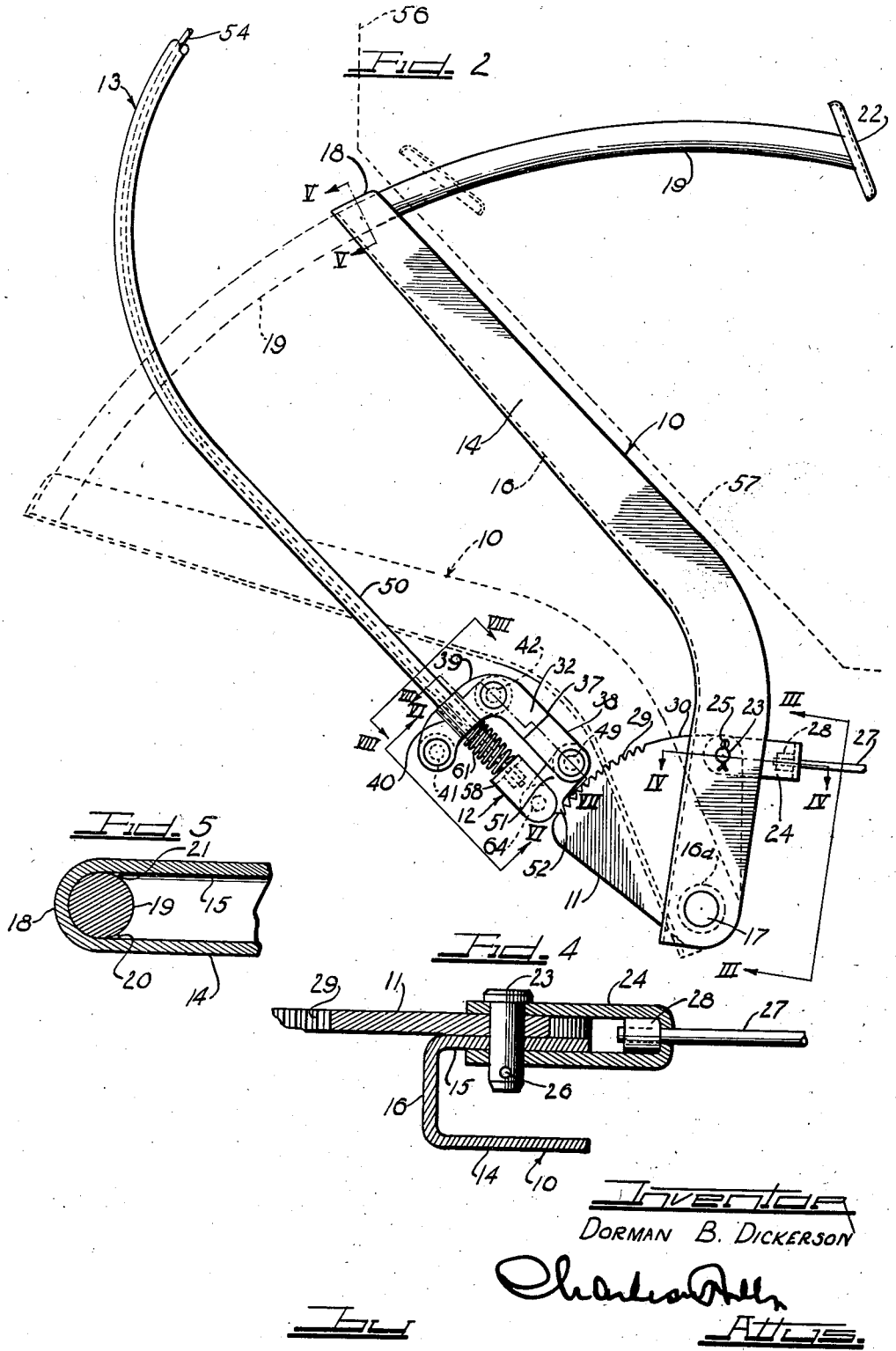

Patented Apr. 21, 1942

2,280,644

UNITED STATES PATENT OFFICE 2,280,644

EMERGENCY FOOT BRAKE LEVER

Dorman B. Dickerson, Detroit, Mich., assignor to Houdaille-Hershey Corporation, Detroit, Mich., a corporation of Michigan Application July 21, 1941, Serial No. 403,252

3 Claims. (Cl. 74—540)

The present invention relates to actuating lever mechanisms and more particularly to a brake operating device for vehicles.

Generally, the present invention includes a pawl and ratchet mechanism cooperating to hold a brake actuating lever in an adjusted position. The pawl permits the ratchet to move relative thereto as the lever is actuated in a direction for applying the brakes and holds the lever in the adjusted position to which it is finally moved. Release of the lever for movement in a brake releasing direction is by means of a Bowden wire control operable remotely from the lever.

The device herein illustrated and to be described, is particularly adapted for use with a foot pedal, but the arrangement may also obviously be used with any type of lever including the so-called dash type.

One of the objects of the present invention is the provision of a lever mechanism having novel holding and release means.

Another object of the present invention is the provision of an actuating lever mechanism which is held in an adjusted position and released therefrom by a remote control.

A further object of the present invention is the provision of an actuating mechanism having pawl and ratchet means for holding the mechanism in adjusted positions with a remote control release therefor, the pawl and ratchet means being relatively movable independently of the remote control.

A still further object of the present invention is to provide a novel brake holding mechanism in combination with a foot operated pedal with a release mechanism therefor operated from the instrument panel of the vehicle on which the release mechanism is mounted.

Another and still further object of this invention is to provide a novel brake holding mechanism for vehicles which is compact, simple and rugged in construction, easily installed, and adaptable to large scale production at low cost.

The novel features believed to be characteristic of the present invention are set forth with particularity in the appended claims. The invention itself, however, both as to its organization and manner of construction, together with further objects and advantages thereof, may best be understood by reference to the following description, taken in connection with the accompanying drawings, in which:

Figure 1 is a view in side elevation illustrating a lever mechanism constructed in accordance with the principles of the present invention;

Figure 2 is an enlarged fragmentary view of the lower portion of the mechanism illustrated in Figure 1, which shows the lever construction in greater detail;

Figure 3 is an enlarged fragmentary side view as seen in the plane taken substantially along the line III—III of Figure 2;

Figure 4 is an enlarged fragmentary transverse cross-sectional view, with parts in elevation, as seen when taken substantially in the plane indicated by the line IV—IV of Figure 2;

Figure 5 is an enlarged fragmentary vertical cross-sectional view as seen in the plane taken substantially along the line V—V of Figure 2;

Figure 6 is an enlarged fragmentary view in side elevation as seen in the plane taken substantially along the line VI—VI of Figure 2;

Figure 7 is an enlarged vertical cross-sectional view, with parts in elevation, as seen when viewed in the plane indicated substantially by the offset lines VII—VII of Figure 2; and, Figure 8 is an enlarged transverse cross-sectional view, with parts in elevation, as seen when viewed in the plane taken substantially along the line VIII—VIII of Figure 2.

The actuating lever mechanism illustrated in Figure 1 generally includes an actuating lever 10, a ratchet member 11 carried by the lever, a pawl construction 12 cooperable with the ratchet 11, and a Bowden wire release mechanism 13.

While the device of the present invention is illustrated in combination with a foot pedal, it is to be understood that the combination may include any type of actuating lever such as the so-called dash type, in which a lever is supported in depending relation from the dash board of a vehicle.

The actuating lever 10, shown in cross section in Figure 4, is of U-shaped construction, having spaced side walls 14 and 15 connected by a web 16. The lower end of the lever is provided with aligned openings 17 through the side walls thereof for pivotally connecting the lever, by any suitable means such as a rivet, bolt or the like, to a suitable support such as a vehicle frame. An apertured spacer 16a is inserted between the lever sidewalls 14 and 15 with its aperture in alignment with the openings 17 as shown in Figure 3.

The lever side walls 14 and 15 are connected together at the upper end of the lever to form a semi-circular portion 18 (Figure 5). One end of a rod 19 is seated within the upper end of the lever 10 against the lever portion 18 and is connected thereto by any suitable means such as welding as shown at 20 and 21. The opposite end of the rod 19 carries a foot pedal 22 thereon.

The ratchet plate 11 is generally triangular in shape with one apex portion having an aperture therethrough in registry with one of the openings 17 whereby it is co-supported with the lever on the support pivot passing through the apertures. As best shown in Figure 4, the ratchet plate 11 is positioned in face engagement with the lever side wall 15 and suitable registered openings are provided therethrough for receiving a pin 23. A clevis member 24 is also carried by the pin 23 and straddles the ratchet plate 11 and the lever side wall 15. The pin 23 is maintained in position by a cotter pin 25 inserted through an opening 26 at one end of the pin adjacent the inner leg of the clevis member.

A brake actuating rod 27 passes through the clevis member 24 and is connected thereto by a retaining member 28. The retaining member may be a nut threaded to the end of the actuating rod 27 or may be a sleeve member against which the end of the actuating rod is upset.

A series of ratchet teeth 29 are provided along the curved edge 30 of the ratchet plate 11. These teeth are engaged by the pawl construction 12 for maintaining the lever 10 in a position to which it is adjusted.

The pawl construction includes spaced supporting members 31 and 32 (Figure 7) each of which are L-shaped in side view as illustrated in Figures 1 and 2. The supporting member 31 has a long leg 33 with an offset end portion 34 (Figure 7). A shorter leg 35 on the support member 31 has a partially circular part 36 extending in a direction substantially parallel to the longitudinal axis of the leg 33. Similarly, the supporting member 32 has a long leg 37 with an offset end portion 38 adjacent and in opposed relation to the offset portion 34 on the supporting member 31. A short leg 39 on the supporting member 32 has a partially circular part 40 extending in opposed relation to the partially circular part 36.

The legs 35 and 39 of the supporting members 31 and 32 are suitably apertured to receive therethrough rivets 41 and 42 or other similar suitable connecting means.

A support member 43, L-shaped in side view similar to the supporting members 31 and 32, has end portions 44 and 45 along one leg thereof for receiving therethrough the rivets 41 and 42. This supporting member 43 is either adapted for connection to a part of the vehicle, such as the frame, or may be a supporting portion of the vehicle, such, for example, as the frame, the transmission, or the like. The leg portion 46 intermediate the ends 44 and 45 is offset as shown in Figure 8 to provide clearance for the partially circular portion 36 on the support member 31. As shown in Figure 7, the end 45 has an extending web 47 which terminates in a supporting end portion 48. The supporting ends 45 and 48 are in alignment with the ends of the leg 33 of the supporting member 31. The supporting end 48 and the offset ends 34 and 38 of the support members 31 and 32 are apertured to receive therethrough a rivet 49 or other similar fastening means.

It is to be noted in Figures 1 and 2, that the supporting members 31 and 32 have their long legs 33 and 37 in substantial alignment with a radius describing the curved surface 30 struck from the center of the lever pivot extending through the openings 17. The shorter legs 35 and 39 are so positioned as to grip therebetween a Bowden wire conduit 50 between the partially circular portions 36 and 40.

The spaced offset ends 34 and 38 at the ends of the long legs of the members 31 and 32 include therebetween a pawl member 51. This pawl member is suitably apertured to be carried by the rivet 49 between and extends forwardly from the offet leg portions 34 and 38. A projecting tooth 52 is formed on the lower edge of the pawl 51 for engagement with the ratchet teeth 29.

The pawl 51 is manually actuated by a control button 53 which is connected to the pawl by a Bowden wire 54. One end of the conduit 50 extends through the instrument panel 55 and is connected thereto by an apertured connector member 50a. The Bowden wire 54 slidably extends through the conduit 50 and the connector member 50a while the button 53 is mounted on the free end of the wire for movement toward and away from the connector member. The other end of the conduit 50 is clamped between the partially circular portions 36 and 40 of the supporting plates 31 and 32.

As best shown in Figure 1, the Bowden wire conduit 50 extends through the dash board 56 at a point spaced sufficiently above the lever 10 as to permit operation of the lever without interference. The actuating lever is positioned below the foot board 57 with the rod 19 extending therethrough to place the foot pedal 22 in an operative position relative to the vehicle driver and to one side of a steering column 57a.

The end of the Bowden wire 54 adjacent the pawl 51 is connected thereto by means of a clevis 58 (Figure 6). The Bowden wire is inserted through an aperture in the web 59 of the clevis and a nut or sleeve 60, or other suitable fastening means, is connected to the end of the Bowden wire. This connection permits the clevis 58 to slide on the Bowden wire 54 with the web 59 being normally maintained in abutment with the nut 60 by a coil spring 61 interposed between one end of the partially circular portions 36 and 40 and the web of the clevis 58.

The ends 62 and 63 of the legs of the clevis 58 are inturned toward each other to present a space therebetween for receiving the forward end of the pawl 51. The leg portions 62 and 63 are pivotally connected to the end of the pawl 51 by means of a pivot 64, such as a rivet, bolt or the like.

The coil spring 61 normally maintains the pawl 51 in engagement with the ratchet teeth 29 and the abutment connection between the nut or sleeve 60 on the ends of the Bowden wire 55 and the clevis 58 permits relative movement between the pawl and ratchet as the lever 10 is moved to the left or in an actuating position. During this movement, the pawl tooth 52 ratchets over the ratchet teeth 29 and the clevis web 59 slides on the Bowden wire 54 away and toward the sleeve 60. The coil spring 61 serves to normally maintain the web 59 in abutment with the sleeve 60 whereby the pawl is urged into engagement with the ratchet for maintaining the lever in an adjusted position.

Release of the lever mechanism 10 for movement toward the right or in a direction in which the vehicle brakes are released, is effected by a pull exerted on the Bowden wire control button 53. When the button 53 is released, the coil spring 61 moves the button back into abutment with the member 50a connecting the Bowden wire conduit 50 to the instrument panel 55. The usual spring arrangement (not shown) may be provided with the brake linkage to exert a tension on the brake actuating rod 27 thereby to return the lever 10 to its projected operative position when release is effected between the pawl and ratchet.

It will be apparent from the foregoing that I have provided a lever mechanism which is held in adjusted position by cooperating pawl and ratchet means with the pawl means being remotely actuated for releasing the lever mechanism.

While a particular embodiment only of this invention has been illustrated, it will, of course, be understood that the invention should not be limited thereto, since many modifications may be made and, therefore, it is contemplated by the appended claims to cover all such modifications as fall within the true spirit and scope of the present invention.

I claim as my invention:

1. In a lever mechanism having a pivotally mounted lever, clutching members for holding said lever in an adjusted position, one of said clutching members being movable with said pivoted lever, a flexible wire release member, and a conduit for said release member, the improvements which comprise a mounting construction having co-extensively arranged members, each of said members having angularly extending legs, means pivotally mounting one end of the other clutching member to and between adjacent legs of said co-extensive members for movement into and out of engagement with said one clutching member, means on the other adjacent legs of said co-extensive members for clamping said conduit therebetween, a clevis straddling and being pivotally connected to the other end of said other clutching member, the web of said clevis being apertured to slidably receive one end of said flexible wire therethrough, enlarged abutment means on said one end of the flexible wire for engagement with the web of said clevis whereby said other clutching member is moved out of engagement with said one clutching member by said flexible wire, and resilient means embracing said flexible wire and being seated between the web of said clevis and said clamping means for normally maintaining said clutching members in engagement, said clevis sliding on said flexible wire against said resilient means to permit movement in one direction of said one clutching member relative to the other clutching member.

2. In a lever mechanism having a pivotally mounted lever, a ratchet plate connected to said lever for movement therewith, a pawl for engagement with said ratchet plate to hold said lever in an adjusted position, a flexible wire release member for said pawl, and a conduit for slidably receiving said flexible wire member therethrough, the improvements comprising a support mechanism including opposed L-shaped members, adjacent leg portions at one end of said support mechanism being spaced for pivotally supporting therebetween one end of said pawl for movement into and out of engagement with said ratchet plate, adjacent leg portions at the other end of said support mechanism having partially circular portions arranged to clamp one end of said conduit therebetween, a U-shaped clevis member straddling and being pivotally connected to the other end of said pawl, the web of said clevis member being apertured for slidably receiving said flexible wire member therethrough, a headed end on said wire member arranged to abut against said web whereby said pawl is moved out of engagement with said ratchet plate by said flexible wire member, and a coil spring embracing said flexible wire member and having one end seated against said web and its other end seated against said partially circular clamping portions for normally maintaining said pawl in engagement with said ratchet plate, said clevis sliding on said flexible wire member against said coil spring to permit movement of said ratchet plate in one direction relative to said pawl.

3. In a lever mechanism having a swingable lever, cooperating clutching members for holding said lever in an adjusted position, one of said clutching members being arranged for movement with said lever, and release means for actuating the other clutching member out of engagement with said one clutching member, the improvement which comprises a support mechanism including opposed plate members each having angularly arranged legs, adjacent legs on said plate members being spaced for pivotally supporting therebetween said other clutching member, other adjacent legs on said plate members having partially circular portions for slidably supporting said release means, means connecting said release means and said other clutching member, and resilient means embracing said release means and being seated between said connecting means and said partially circular portions for normally maintaining said other clutching member in engagement with said one clutching member.

DORMAN B. DICKERSON.